United States Patent [19]
Hull

[11] Patent Number: 5,448,287
[45] Date of Patent: Sep. 5, 1995

[54] SPATIAL VIDEO DISPLAY SYSTEM
[76] Inventor: Andrea S. Hull, 2604 N. 9th St., Arlington, Va. 22201
[21] Appl. No.: 55,115
[22] Filed: May 3, 1993
[51] Int. Cl.⁶ ..................... H04N 13/00; H04N 15/00
[52] U.S. Cl. .......................................... 348/39; 348/36; 348/48
[58] Field of Search ............... 358/87, 89, 88, 93, 358/254; 395/119; 348/36, 47, 48, 52, 39; H04N 13/00, 15/00

[56] References Cited
U.S. PATENT DOCUMENTS

| | | | |
|---|---|---|---|
| 3,542,948 | 11/1970 | Wolf | 358/87 |
| 3,560,644 | 2/1971 | Petrocelli | 178/6.8 |
| 4,334,245 | 6/1982 | Michael | 358/183 |
| 4,355,328 | 10/1982 | Kulik | 358/87 |
| 4,853,764 | 8/1989 | Sutter | 358/254 |
| 5,130,794 | 7/1992 | Ritchen | 358/87 |
| 5,179,440 | 1/1993 | Loban et al. | 358/87 |

Primary Examiner—Tommy P. Chin
Assistant Examiner—Vu Le

[57] ABSTRACT

Blue Ring is a system for video display comprising a multiplicity of non-contiguous but simultaneous video images distributed in space so as to create the illusion that the viewer is inside moving action. It uses digital video playback technology currently in the form of videodisc machines with a microchip controller to achieve the degree of simultaneity necessary for the illusion of motion surrounding the observer.

10 Claims, 5 Drawing Sheets

SPATIAL VIDEO DISPLAY SYSTEM

BACKGROUND OF INVENTION

There have been significant advances in video display technology in recent years. One of the most visually spectacular technological creations of the last decade is the video wall, in which a rectangular array of video display units—television monitors—has the units placed with the pictures nearly contiguous. In this system, the signal, usually from a single video picture, is electronically processed so that a segment of the picture appears on each video screen, the segments being arranged so that the original picture is reconstituted (except for the interstitial margins) in the large on the array of video screens. Some very striking video effects not limited to a single simultaneous picture are also possible, for example, sequencing of images on individual units with partial image changeover so that the transition to a new image appears to occur by sequential replacement of pieces of the picture.

Several patents have disclosed technical improvements useful in the video wall, e.g., Blokland et al., U.S. Pat. No. 4,695,135; Kalua, U.S. Pat. No. 4,866,530. There exist also multi-image video projection systems which produce a slightly overlapped multiple flat image closely analogous to that of the video wall. E.g., Ogino, et al., U.S. Pat. No. 5,011,277. The video wall and its derivatives, however, do not attempt to put the viewer psychologically "inside" the scene or otherwise enhance the sense of dimensionality or the perception of movement in space. The video wall instead produces a very large flat television picture viewable by large live audiences, for example at mass meetings.

Another type of highly technological display currently available is usually referred to as a "virtual reality" system. Although the term "virtual reality" does not have a fixed definition, it most frequently refers to a system in which a computer generates images of an imaginary scene. Typically, computer created images are directed to two display elements inside a headset such that the viewer sees only the computer created images. The images create a stereoscopic illusion of three dimensional space for the viewer, but the images are not "real," that is, they are computer generated, not taken from photographic images. The computational process produces left and right eye perspective images in real time as the observer moves, as though these images were viewed from the virtual location of the observer in the imaginary space. A known application for this technology is to allow an observer to experience what the inside of an architectural space will "feel" like when later constructed. Normally the virtual space which can be viewed is very limited and the process is very computation intensive.

Others, e.g., Naimark, U.S. Pat. No. 4,857,902, issued Aug. 15, 1989, have developed what are referred to as "virtual environment" systems. In a virtual environment system the intent is not to create a perception of three dimensional space so much as it is to give the observer a single flat image which is keyed to a particular location in an actual, but not present, three dimensional scene. The observer may move about in an imaginary way, for example with a mouse keyed to a map, and see what the place looks like from that vantage point, although not with a three dimensional effect. In Naimark, a vast array of images of a particular locale is stored on video disk. The computer is basically a fast look-up device for flat images. The system operates on observer-controlled time, not locked one-to-one with real time.

Yet another class of systems attempts to create a certain sense of dimensionality by placing the viewer inside a projected replica of a surrounding scene. The archetypal example of such a system is the light-point projection system used in a planetarium to create a half-spherical image of the night sky. In most planetaria these images move to represent the observational changes in the night sky over a chosen period of time which is usually a scale time. Much work has also been done with respect to the making and display of hemispherical photograpic images, e.g., McCutchen, U.S. Pat. No. 5,023,725, issued Jun. 11, 1991. Normally neither real time nor real elapsed time, i.e., simulated real time, motion is an element of such displays.

A very recent example of a complex system attempting to create a spatial sense impression potentially involving real time motion is the "surround" display system disclosed in Ritchey, U.S. Pat. No. 5,130,794, issued Jul. 14, 1992. Ritchey discloses a system which appears to be in essence a very large video wall distorted into a spherical surface with the viewer inside. The observer is located on a transparent floor so that the scene appears above and below. This system involves complex image processing to achieve spherical coverage. One application for the Ritchey system is a flight simulator. Another is displaying panoramic images from remotely piloted vehicles (pilotless aircraft). A related system is disclosed in Couturier, U.S. Pat. No. 5,151,802, issued September 29, 1992. Such systems have shared drawbacks in that they are extremely expensive and highly equipment intensive, involve precision engineering, and require a high degree of image processing or computation.

A somewhat similar system also operates in real time but does not particlarly attempt to convey a sense of space. Tuck, U.S. Pat. No. 4,772,942, issued Sep. 20, 1988, discloses a display system with a relatively small cone of viewable space suitable for direct viewing of a scene from inside a military vehicle such as a tank or a submarine. Tuck uses contiguous video display monitors for displaying inside a closed structure an arc of the exterior scene covering less than 90 degrees as events actually happen. This system, though potentially useful in armored weapons systems, undersea vehicles, and simulators, is expensive and complex, has a very limited number of simultaneous viewers, and does not attempt to create an illusion of space. This system also is equipment intensive and requires sensitive matching of image edges.

There has been a felt need for some time, in artistic endeavors, in advertising, in education, in public interest displays, and in entertainment, including home use, of a technically simple, relatively inexpensive system to display moving images to multiple viewers. In particular, there has been a need to display action in such a way that the viewer gets a psychological sense of being surrounded by movement in space without dauntingly expensive equipment.

However, the most important limitation of all of the prior art systems for video display is that they do not take advantage of recent scientific progress in understanding the role of peripheral vision in perceiving motion in space. Such knowledge has proved important in the design of certain aspects of flight simulators, especially in the creation of artificial horizons therein. Morley, U.S. Pat. No. 4,743,903 issued May 10, 1988 and U.S. Pat. No. 4,616,226 issued Oct. 7, 1986, and Malcolm et al., No. 4,397,555 issued Aug. 9, 1983, use the distinction between central focal, or foveal, vision which is acute but limited to a cone of a few degrees about dead ahead, and peripheral vision, which is far less acute but is critical to sensing orientation and motion. Peripheral vision utilizes dedicated cerebral faculties which recognize movement of line features in the peripheral vision field.

Details about the relative movements and positions of objects are conveyed to a specialized portion of the visual cerebral cortex responsible for motion perception. See Semir Zeki, "The Visual Image in Mind and Brain, " Scientific American, September 1992, p. 69. The inherent perceptual function of the human brain of apprehending motion is carried on continuously and automatically and requires no conscious attention. Thus a system which provides information about movement through the peripheral vision field makes use of the dedicated motion perceiving faculties of the visual cerbral cortex which operate below the level of conscious attention, thereby producing an intuitive sensation of motion not subject to conscious control.

It is therefore a first object of the current invention to use the unique properties of the peripheral vision system to provide the desired illusion inexpensively and with technical simplicity. It is a second but also important object of this invention to provide a relatively inexpensive system for display of visual information creating the illusion that the observer is inside a three dimensional space in which movement is taking place relative to the observer, who in turn moves in response to the images.

SUMMARY OF INVENTION

The current invention is directed to making the viewer experience the psychological sensation of being inside a scene where action, such as a performance by a dance troupe, is occurring, without massive apparatus and computers by using the properties of peripheral vision. I call the illusion achieved "virtual space." This invention, called "Blue Ring" in its current embodiment, is a new concept in video display. Blue Ring constructs the illusion of a simultaneous 360 degree visual space for the observer by assuring that images related in space-time appear in the observer's peripheral vision from whatever direction the viewer elects to observe.

Blue Ring's perceived visual space, which surrounds the viewer, is in contrast both to the proscenium space of live performance and to the flat frontal space of the film screen and video monitor. A sense of architecture gives us a sense of the space in that part of a room to which our backs are turned. In somewhat the same way, Blue Ring, by rigorously maintaining the sensation of unity of space and time, conveys this "architectual" quality to the viewer. Blue Ring is also large enough in its current embodiment to be viewed simultaneously by ten observers.

Blue Ring utilizes a small number of spatially dispersed and non-contiguous video display units with the video playbacks synchronized digitally so that the different displays seem to the observer to show simultaneously different parts of the same ongoing (simultaneous) action. The spatial dispersion is crafted so that one or perhaps two monitors are visible in the observer's peripheral vision field when he or she is looking at a particular monitor which is in central focus. The synchronized action on multiple screens, even though separated, creates a sensation of being within the action occuring in space by using the motion perception properties of the visual cerebral cortex. The illusion is created by a multiplicity of simultaneous but non-contiguous views of the action spaced evenly over a 360 degree horizontal panorama such that at least one and sometimes two or more moving pictures are in peripheral vision when one is in central focal or foveal vision.

Notwithstanding the lack of hemispherical or cylindrical coverage, the observer experiences the illusion of perceiving movement in space. In its current implementation Blue Ring is being used to display imagery of a dance troupe performing, as it seems to the observer, around the observer. It can also be used, for example, to create the illusion of watching a vehicle move around the observer. A possible home entertainment use would be to combine Blue Ring with surround sound to reproduce a multitrack version of an action motion picture.

DETAILED DESCRIPTION OF PREFERRED EMBODIMENT

The automatic physiological phenomenon of peripheral vision produces the effect of a visual object (in the current embodiment of Blue Ring a dancer) moving from one cone of space (shown in a particular monitor) to another cone of space (shown in another monitor) in real time. The dimensions of Blue Ring have been designed in such a manner, and it is a central feature of this invention, that one monitor only is in central focal or foveal vision at any one time, and at least one other and sometimes two monitors are in peripheral vision when the central monitor is in focus. It is the traverse of an image from peripheral vision to central focus vision in real time which produces the effect created by this invention.

That is, when a dancer leaves monitor number one's right frame edge, she thereafter appears in monitor number two's left frame edge after precisely the amount of time it would have taken her to traverse the negative space, that is, the space in the real studio not shown in the pictures or the construct space implicit in the imagined scene. Obviously "downstage" distance closer to the observer—is traversed more rapidly than "upstage" distance, because the actual distance in the studio between the upstage right edge of monitor one to the upstage left edge of monitor two is greater than the distance between the respective downstage edges.

The other aspect of the Blue Ring embodiment which aids the illusion of motion is the fact that each monitor maintains the same cone of 360 degree space throughout the length of the program. Conventional film and video make use of the medium's celebrated capability for rapid changes of spatial perspective, camera angle, and location. Blue Ring, however, creates the illusion of continuous real time action in a space whose integrity is maintained throughout the length of a program. Therefore Blue Ring in the current embodiment creates a 360 degree visual space, instantaneously synchronized between its six monitors and continuously maintained.

Figure 1A:
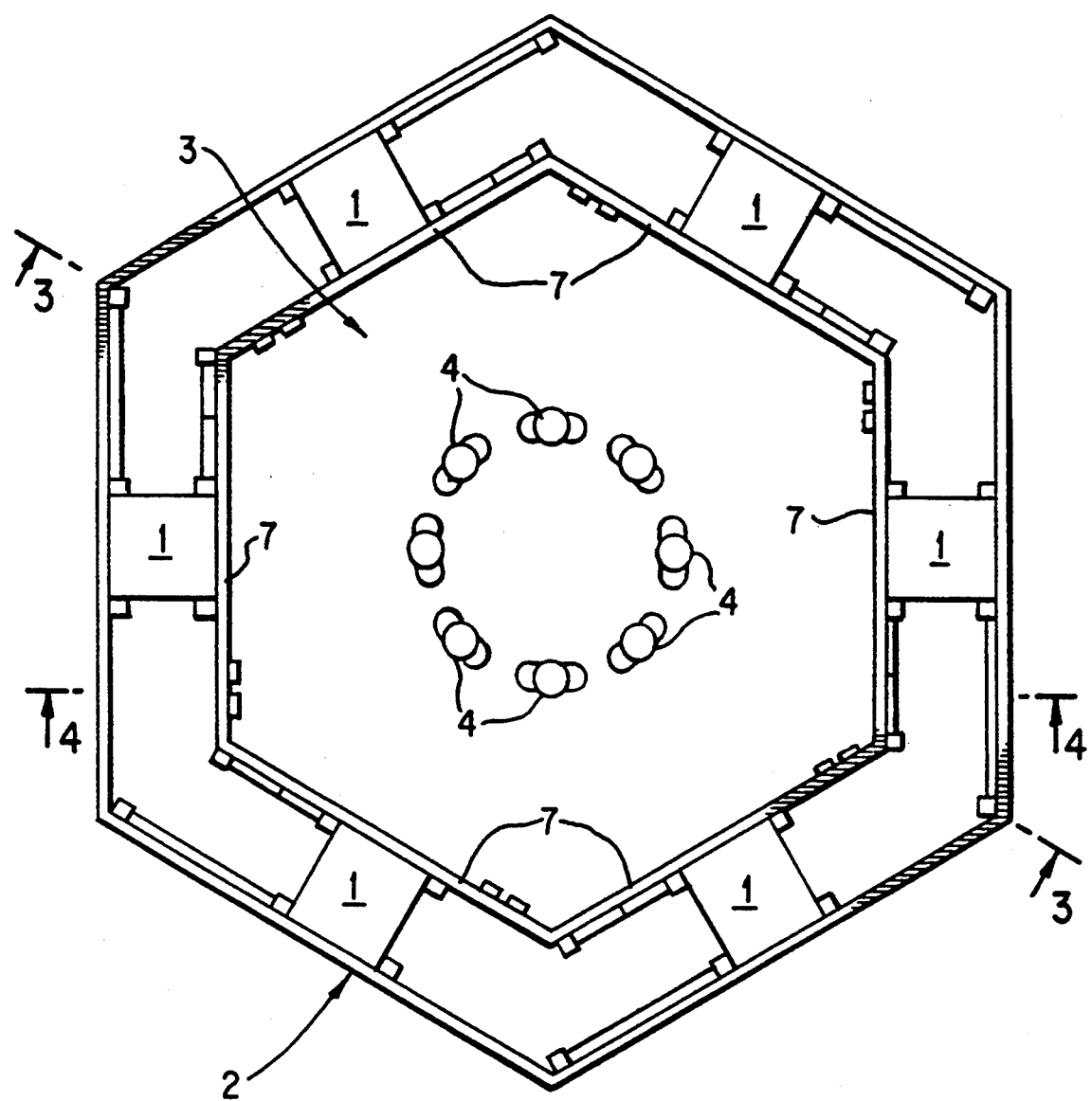
FIG. 1 is a schematic of the Blue Ring arrangement.
Figure 1B:
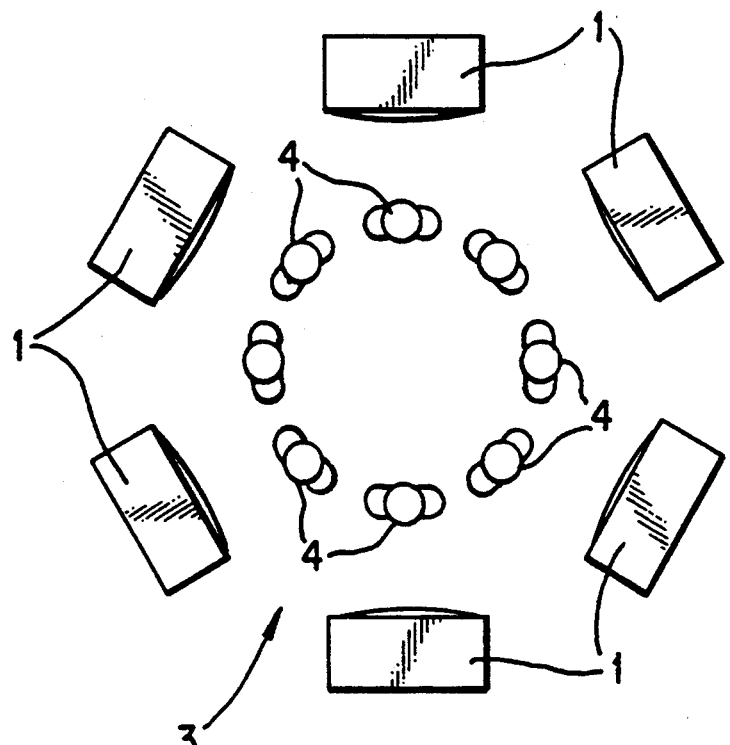

With reference to FIG. 1, in its currently preferred embodiment Blue Ring comprises an installation for six video monitors 1 arranged in the sides of a hexagon 2 about a 16 foot diameter circle 3, facing inward. The audience 4, comprising up to ten people in the current embodiment, stands in the middle this circle, facing outward. Any viewer can only hold one monitor in central focal vision at a time, but also sees at least one other monitor, and probably two, in peripheral vision The approach to shooting the video tape of the event, in the current embodiment a sequence by a dance troupe, is important to the creation of the illusion of motion in three dimensional space. The particular approach for synchronizing the six spatially dispersed playback tracks is critical to making the Blue Ring invention work. These methods represent part of the current best mode of practicing this invention.

Figure 2:
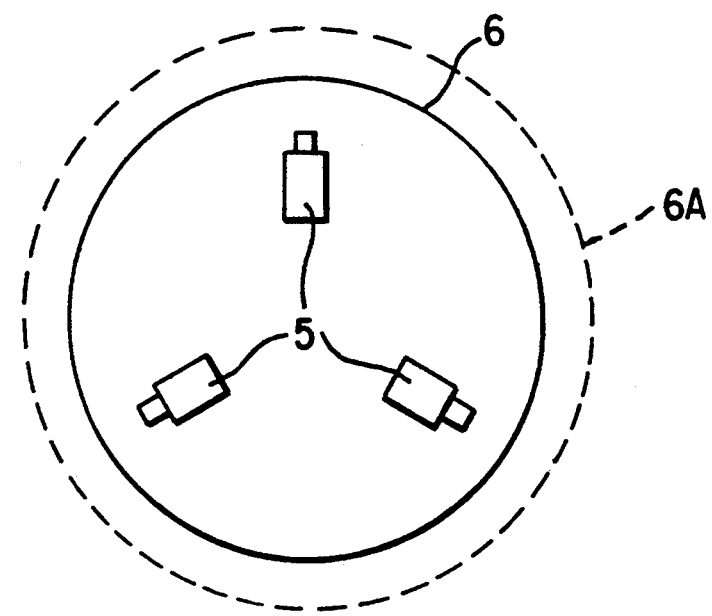
FIG. 2 shows the arrangement of video cameras in one configuration for recording the scene on video tape.

With reference to FIG. 2, the method of shooting a display involves a plurality of video cameras 5 mounted on a roughly round platform 6. In the present embodiment, the number of cameras can be either three or six. If six cameras are used to shoot video tape simultaneously, they must be mounted approximately 60 degrees apart on the platform. Alternatively three cameras spaced 120 degrees apart can be used to produce the same effect by shooting the dance sequence twice, with the three cameras offset from their original positions by 60 degrees for the second shooting. The first demonstration piece, a dance sequence by a troupe, was shot using three Betacam camera/decks in this latter arrangement. With appropriate arrangements to assure the illusion of motion, the dancers can dance in place while the camera platform rotates. Additionally, as long as the editor can make the images match up appropriately in time and space, simultaneous live shooting is not essential to the creation of the Blue Ring illusion; successive filming of only apparently simultaneous events can be used. Another possible alternative which would not require filming of live events at all would involve the use of computer generated or animated images in the appropriate time and perspective sequence.

For creating an edited work for display, analog video decks cannot synchronize the different segments of the action on six different video tracks sufficiently closely in time to obtain the visual spatial illusion which is a major achievement of this invention. Accurate synchronization within a limited tolerance is critical to producing the illusion of motion in three dimensional space and the psychological illusion of being inside the action. The required degree of synchronization of multiple pictures, in the current embodiment within a maximum of 4 frames deviation at 30 frames per second, is only practicable with digital video technology.

Playback of multiple tracks of film footage edited for simultaneity can be achieved because of the dimensional stability of celluloid and the existence of sprocket holes, allowing simple mechanical synchronization. Synchronous analog video playback, however, is at best cumbersome and at worst impracticable. Video tape stretches and deforms, causing the tape to play back at varying speed. Moreover, analog video playback machines have different motor speeds, slightly different wheel sizes, and the like, so that maintaining the required synchronization over a reasonable length of time is not practicable.

Accordingly, the current embodiment of this invention adopts digital video disc technology for synchronicity. The six video tracks of this embodiment underwent a tape-to-videodisc transfer using methods and equipment standard in the video industry. The original footage was shot in Betacam format with an invisible time code for on line editing. The raw tapes were edited onto six master tracks with frames parallel in time.

These images were then transferred to plural digital videodiscs which have frames identified by number which a controller can manipulate for playback.

Playback uses multiple synchronous videodisc players. A simple multiple device controller, the Technovision PC-2, is based on a microchip and is programmable by means of program cards. The controller operates from a keyboard or even by means of a toggle switch. This device permits simultaneous computer control and synchronization of images from multiple videodisc players to within or better than the 100 milliseconds necessary for producing the visual effect of this invention.

Figure 3:
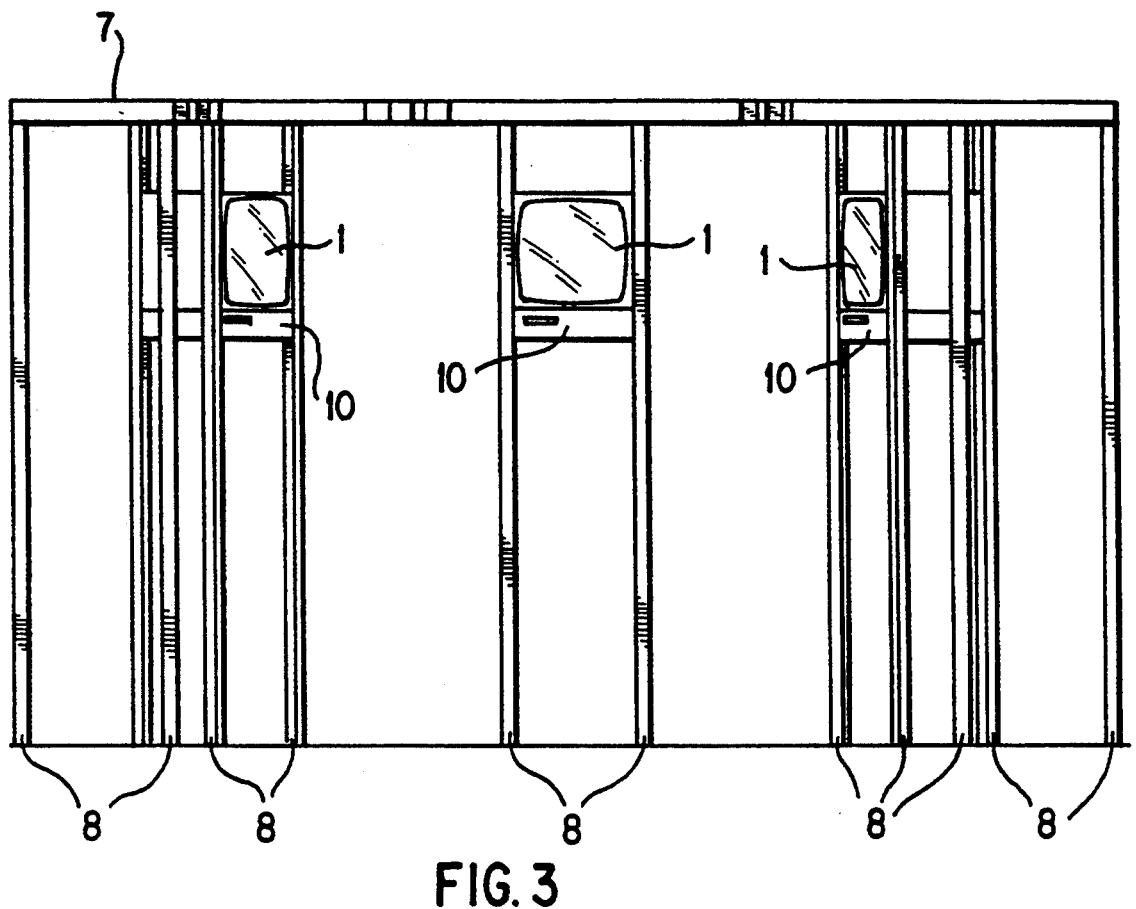
FIG. 3 is a plan view of the Blue Ring display system showing two sections of Blue Ring.
Figure 4:
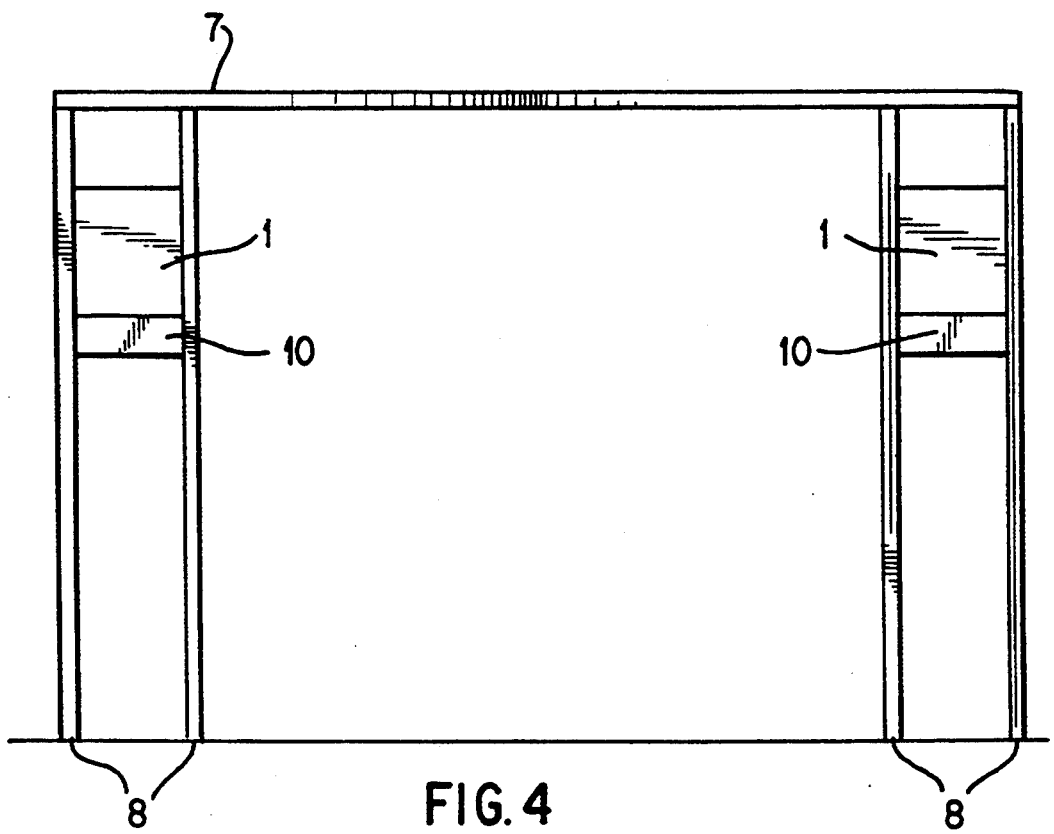
FIG. 4 shows elevation views of two sections.
Figure 5:
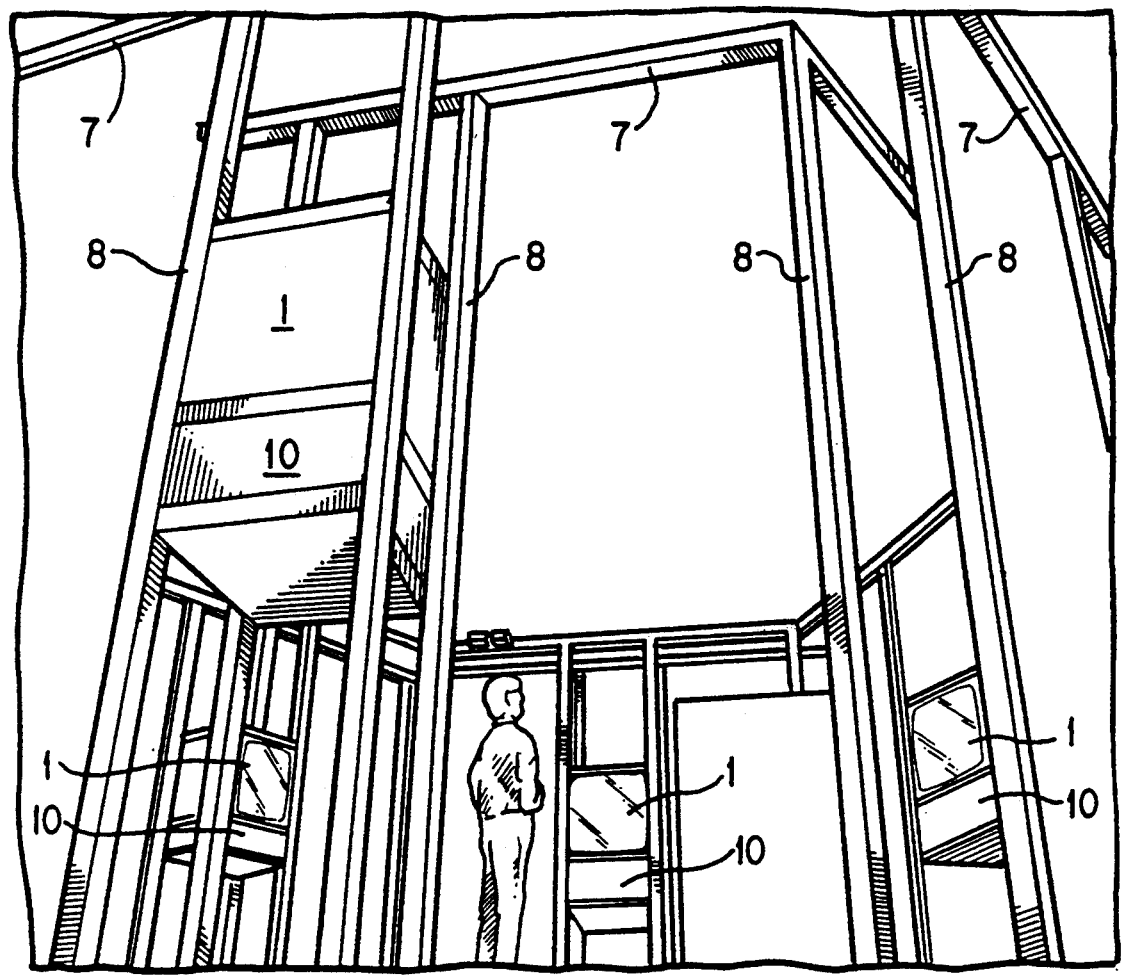
FIG. 5 is a perspective drawing of viewer inside a Blue Ring display as would be seen from slightly below the viewing plane of the audience.
Figure 6:
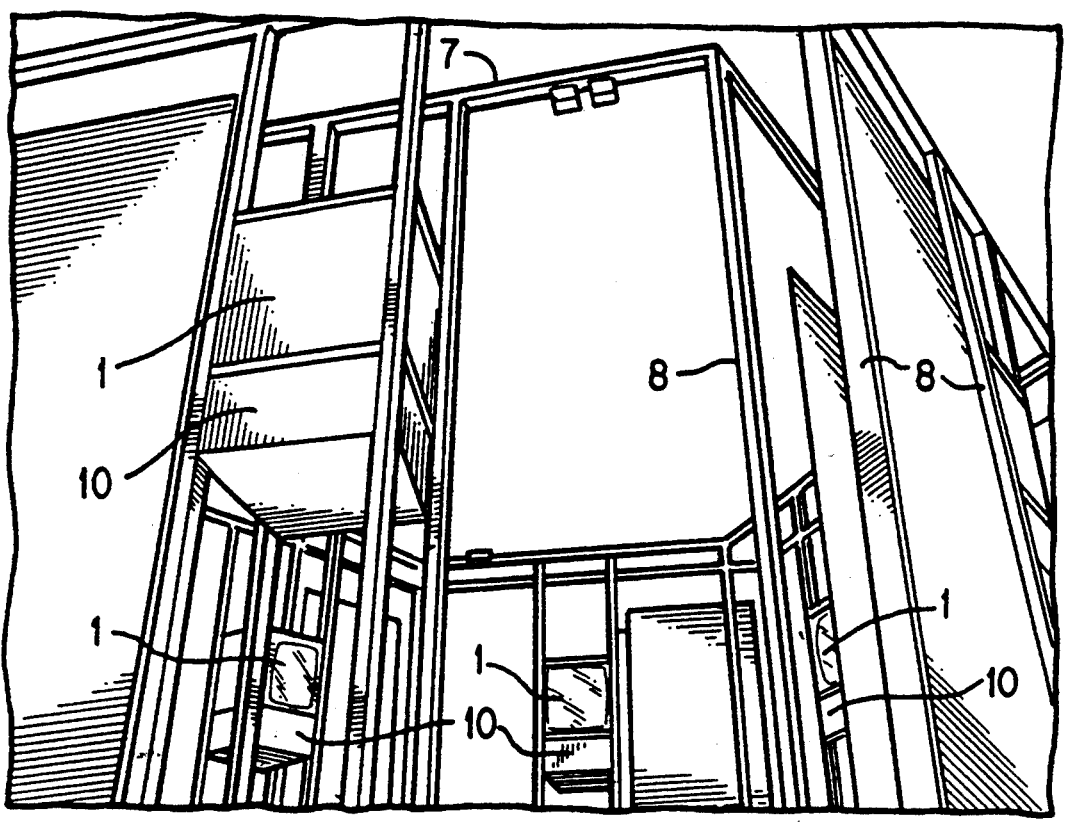
FIG. 6 is the same view from a somewhat closer vantage point and without the viewer shown inside.
Figure 7:
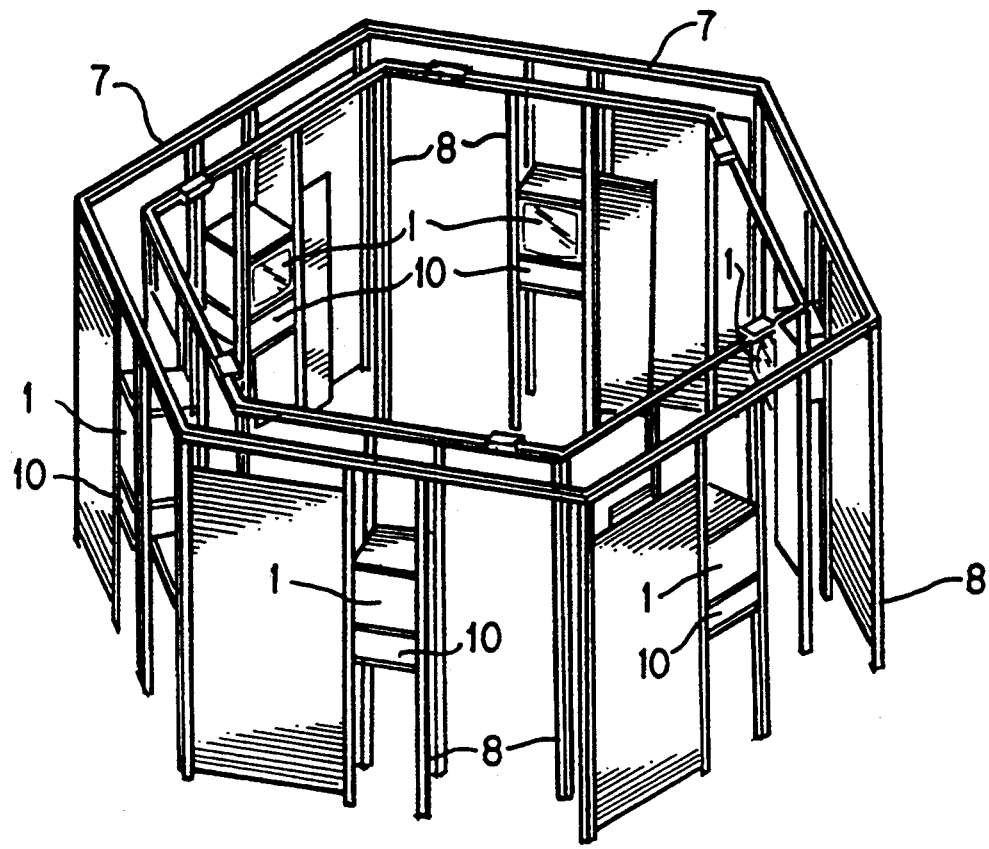
FIG. 7 is another perspective view of Blue Ring from above and outside.

Referring to FIG. 3, the frame 7 of the current embodiment of the display comprises structural members 8 sufficiently rigid and interconnected to hold the assembly together. The hexagonal structure of this embodiment sets the video monitor units 9 used for display approximately 60 degrees apart. Referring to FIG. 4, a video disc player 10 is electronically connected to each monitor unit. The controller (not shown) starts and controls the playback of each videodisc player so that the images are synchronized within the necessary tolerance.

The configuration assures the viewer that, though she might choose to follow a particular dancer moving to the left, the dancer that she sees spinning off to the right and then reappearing, some moments later, to her left, has passed through an established, "architectural" space. Contrary to previous experiences of theatre, dance, film and video, Blue Ring places the observer squarely in the middle of the action and says "The show goes on all around you."

In the current embodiment, Blue Ring uses acoustic sound generated specifically for the display from pulses overlaid on the videodisc tracks. This sound is specific to the particular artistic embodiment and can readily be replaced with synchronous recorded sound on an audio track on the videodiscs, each audio track having a spatial relationship with the video picture on a particular monitor and played back from sound reproduction devices in close proximity to that monitor.

I claim:

1. A system for creating an illusion of action taking place in three dimensional space about a viewer using only discrete spatially dispersed and non-contiguous views comprising small portions of a total spherical or hemispherical representation of a three dimensional action scene, said system comprising:

a plurality of spatially dispersed and non-contiguous video monitors disposed with substantial spacing about a viewer positioned at a central viewing point, said plurality of spatially dispersed and non-contiguous monitors displaying a corresponding plurality of spatially dispersed and non-contiguous images, the spacing of said spatially dispersed and non-contiguous monitors being such that not more than a first of said spatially dispersed and non-contiguous monitors can be in the viewer's cone of central foveal vision at one time and such that at least a second spatially dispersed and non-contiguous monitor must be simultaneously in the viewer's peripheral vision when the first spatially dispersed and non-contiguous monitor is in the viewer's cone of central foveal vision, said plurality of spatially dispersed and non-contiguous images representing a plurality of discrete spatially dispersed and non-contiguous views of a single surrounding three dimensional action scene observed from substantially a single central camera location, each of said plurality of discrete spatially dispersed and non-contiguous views portraying action in each of a plurality of discrete spatially dispersed and non-contiguous spatial camera observation cones traced outward from said single central camera location, each of said spatially dispersed and non-contiguous spatial camera observation cones corresponding in azimuth and elevation with and being substantially equal in size, shape, and orientation to each of a plurality of corresponding viewing cones, each of said viewing cones representing the volume in the space around the viewer traced from the central viewing point outward through each of the plurality of spatially dispersed and non-contiguous images displayed on each of the plurality of spatially dispersed and non-contiguous monitors;

b. a plurality of digital video playback devices connected electronically to said plurality of spatially dispersed and non-contiguous video monitors;

c. a plurality of digital video recordings disposed to play back on said plurality of digital video playback devices and containing recorded versions of said plural spatially dispersed and non-contiguous images, the entire plurality of recorded versions being edited for simultaneity corresponding to the synchronicity of events in the action scene, thereby enabling synchronized playback, by means of said plurality of digital video playback devices on said plurality of spatially dispersed and non-contiguous video monitors, wherein an illusion of action taking place in space around the viewer is created; and d. a programmable electronic controller which exactly synchronizes the display of said plural spatially dispersed and non-contiguous images from said plurality of digital video playback devices on said plurality of video monitors by means of a capability to address identified frames of said digital video recordings.

2. The apparatus of claim 1 additionally comprising sound production apparatus which receives timing signals from one or more of the digital video recordings.

3. The apparatus of claim 1 additionally comprising means for reproducing sound synchronously recorded on said digital video recordings.

4. The apparatus of claim 1 wherein the plural images which are displayed are hand-animated or computer created images.

5. The apparatus of claim 1 in which the plural monitors are arranged so that the display can be seen by plural viewers simultaneously.

6. A method of creating an illusion of action taking place in three dimensional space about a viewer using only discrete spatially dispersed and non-contiguous portions of a total spherical or hemispherical representation of a three dimensional action scene, said method comprising the steps of:

a. recording on a plurality of recording and playback media tracks a plurality of spatially dispersed and non-contiguous images representing a plurality of simultaneous discrete spatially dispersed and non-contiguous views of a single surrounding three dimensional action scene observed from a substantially single central camera location, each of said plurality of simultaneous discrete spatially dispersed and non-contiguous views encompassing action in each of a plurality of discrete spatially dispersed and non-contiguous spatial camera observation cones projecting outward from said single central camera location, said plural simultaneous discrete spatially dispersed and non-contiguous views being chosen such that not more than a first of said plural spatially dispersed and non-contiguous spatial camera observation cones can at one time be in the central foveal vision of a simulated human observer located at said single central camera location and such that at least a second spatially dispersed and non-contiguous spatial camera observation cone must be simultaneously in the simulated human observer's peripheral vision when the first spatially dispersed and non-contiguous view is in the simulated human observer's central foveal vision, each of said spatially dispersed and non-contiguous spatial camera observation cones corresponding in azimuth and elevation with and being substantially equal in size, shape, and orientation to each of a plurality of corresponding spatial viewing cones, each of said spatial viewing cones comprising the volume in the space around a viewer located at a central viewing point projecting out from the central viewing point through each of a plurality of spatially dispersed and non-contiguous video display screens on a plurality of spatially dispersed and non-contiguous video monitors disposed with a substantial spacing for viewing said spatially dispersed and non-contiguous images, the spacing of said spatially dispersed and non-contiguous monitors being such that not more than a first of said spatially dispersed and non-contiguous monitors can be in the viewer's cone of central foveal vision at one time and such that at least a second spatially dispersed and non-contiguous monitor must be simultaneously in the viewer's peripheral vision when the first spatially dispersed and non-contiguous monitor is in the viewer's cone of central foveal vision;

b. editing said plurality of recording and playback media tracks into a plurality of approximately synchronized edited video tracks;

c. transferring said plurality of approximately synchronized edited video tracks to a plurality of digital video recording tracks, said digital video recording tracks containing digitally recorded versions of said plural spatially dispersed and non-contiguous images recorded in such a way as to permit addressing of each frame for playback;

d. playing back said digital video recording tracks on a plurality of digital video playback devices controlled by a programmable electronic controller which digitally synchronizes the playback of said plural spatially dispersed and non-contiguous images from said plurality of digital video playback devices by causing said playback devices to address identified frames of the digital video recording tracks so as to produce a plurality of exactly synchronized picture signals, said controller synchronizing the picture signals for precise simultaneity of the images in accordance with the real or imagined simultaneity of events in the action scene;

e. transmitting electronically said plurality of exactly synchronized picture signals to said plurality of spatially dispersed and non-contiguous video monitors, said plurality of spatially dispersed and non-contiguous monitors converting said plurality of exactly synchronized picture signals into a plurality of exactly synchronized spatially dispersed and non-contiguous images.

7. The method of claim 6 additionally comprising the step of producing sound from information recorded on said digital video playback devices.

8. The method of claim 6 additionally comprising the step of reproducing synchronized sound recorded with one or more of the digital video recordings.

9. The method of claim 6 additionally comprising the step of assembling a plurality of action scenes into a larger composite work.

10. The method of claim 6 wherein the plural images which are displayed are hand-animated or computer created images.

* * * * *